United States Patent [19]

Hehn et al.

[11] Patent Number: 4,709,437
[45] Date of Patent: Dec. 1, 1987

[54] COMPACT DISC CLEANER

[75] Inventors: Bruce A. Hehn, Massillon; James K. Sankey, Lynhurst, both of Ohio

[73] Assignee: Alpha Enterprises, Inc., Canton, Ohio

[21] Appl. No.: 854,905

[22] Filed: Apr. 23, 1986

[51] Int. Cl.⁴ .............................................. B08B 7/00
[52] U.S. Cl. ................................. 15/97 R; 15/210 R; 369/72
[58] Field of Search ............... 15/208, 21 B, 97 R, 15/210 R, 21 R; 369/72

[56] References Cited

U.S. PATENT DOCUMENTS

| | | | |
|---|---|---|---|
| 4,145,244 | 3/1979 | Covey | 15/21 R X |
| 4,520,470 | 5/1985 | d'Arc | 15/97 R X |
| 4,556,433 | 12/1985 | Clausen | 15/102 X |
| 4,561,142 | 12/1985 | Mischenko et al. | 15/97 R |
| 4,569,098 | 2/1986 | Kawabe | 369/72 X |
| 4,641,391 | 2/1987 | De brey | 15/210 R X |

Primary Examiner—Chris K. Moore
Attorney, Agent, or Firm—Michael Sand Co.

[57] ABSTRACT

A compact disc cleaning device contains cleaning pads located on a wall of a housing. A housing cover has an elongated slot and a post assembly is slidably received therein. The post assembly engages the central opening of a compact disc placed within the housing so that upon linear movement of said post in said elongated slot, the compact disc is cleaned with a substantially radial cleaning motion. The device can contain pivot surfaces on side regions of the house to slightly rotate the disc upon movement of the post assembly in the elongated slot.

18 Claims, 10 Drawing Figures

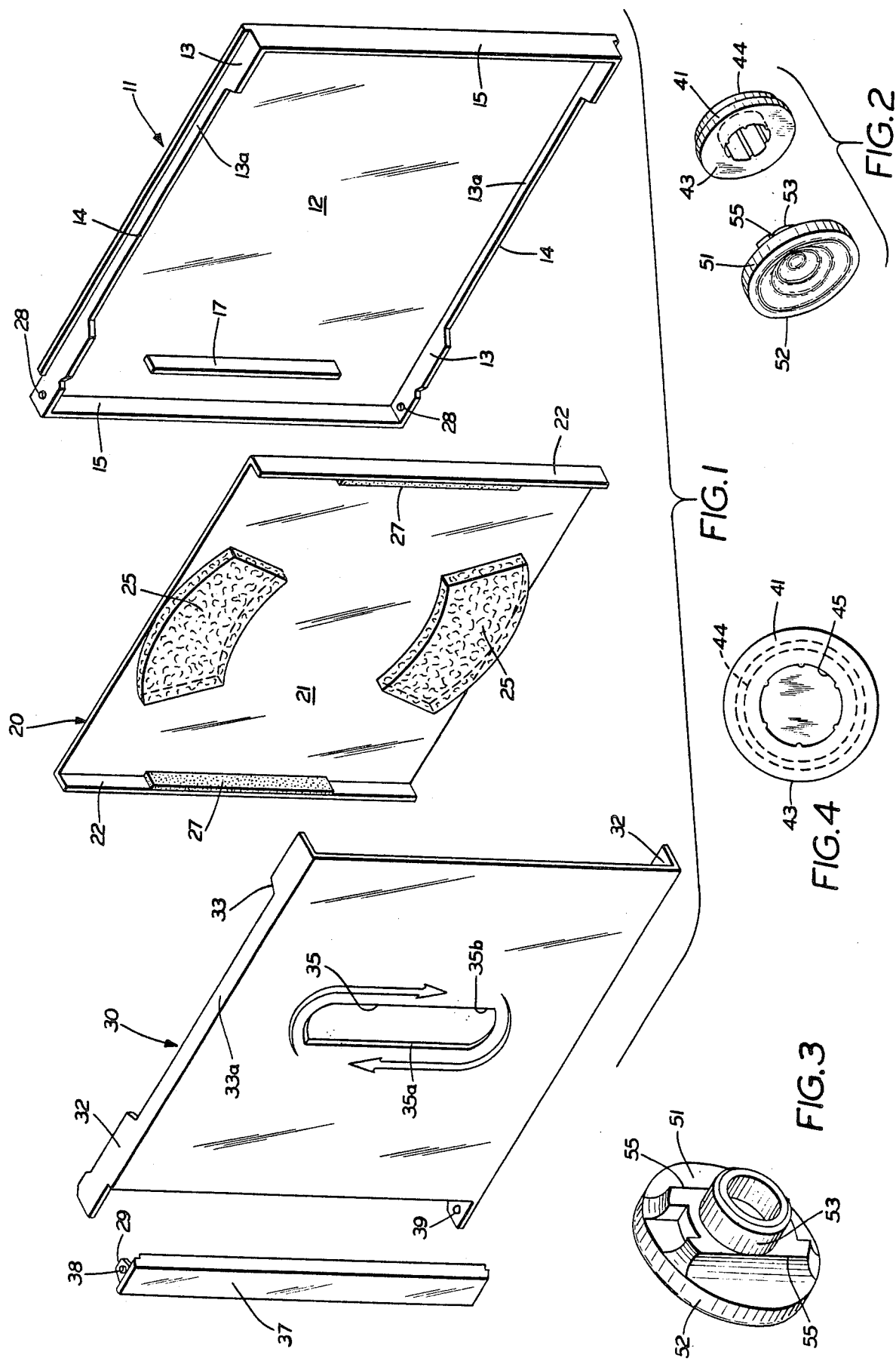

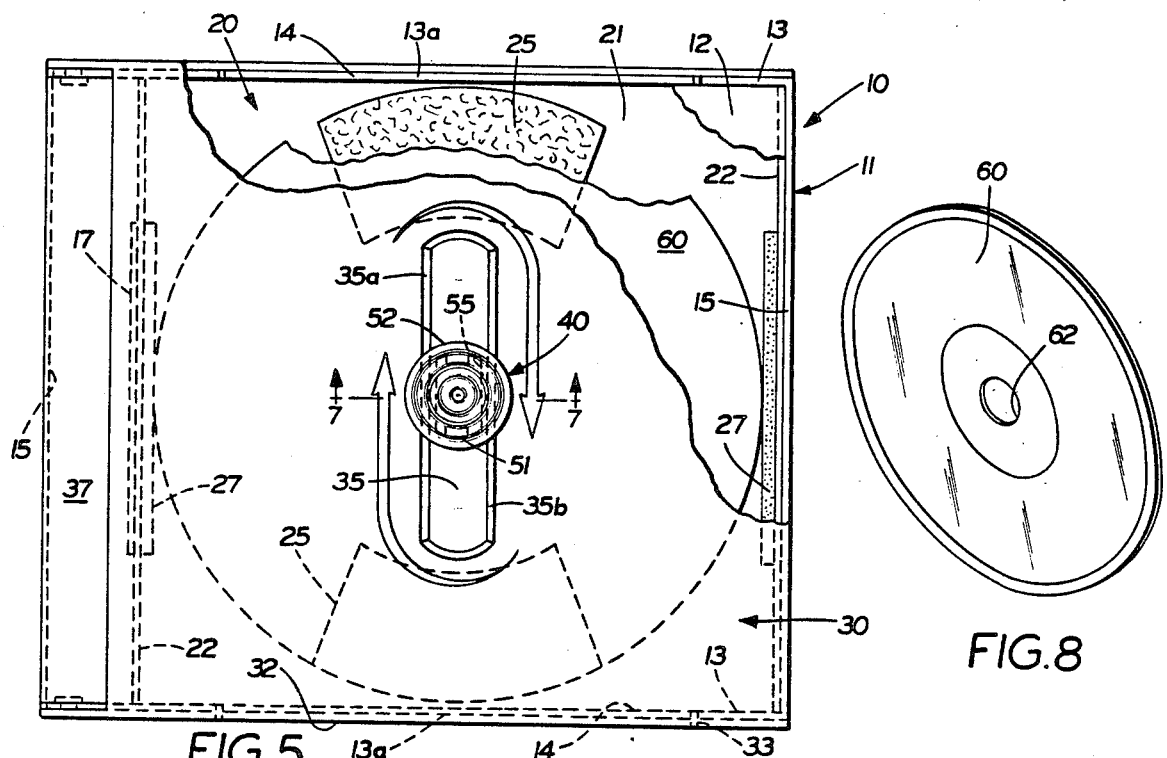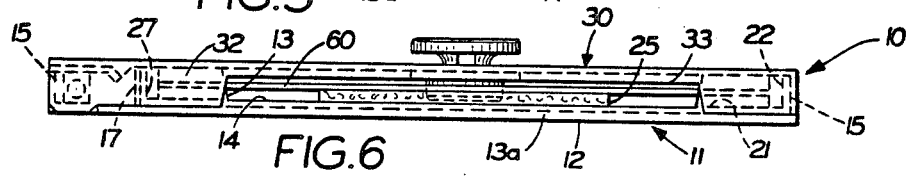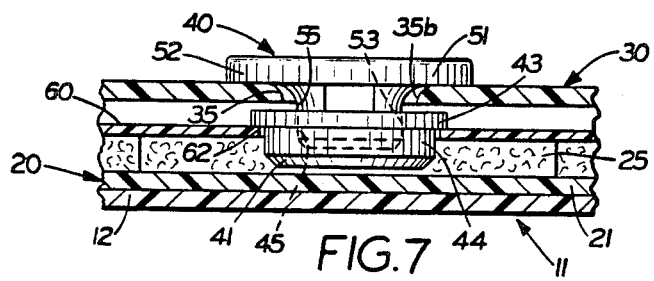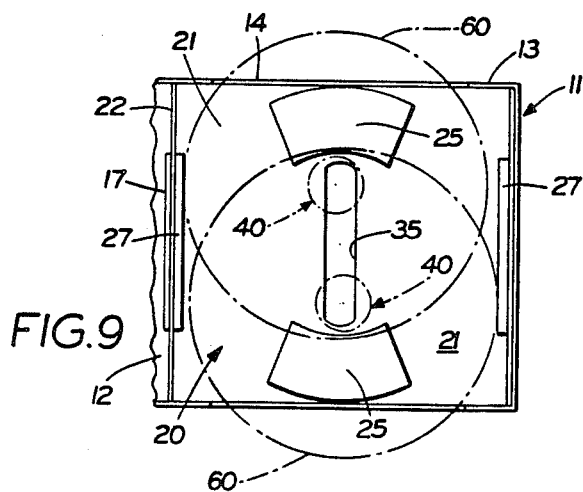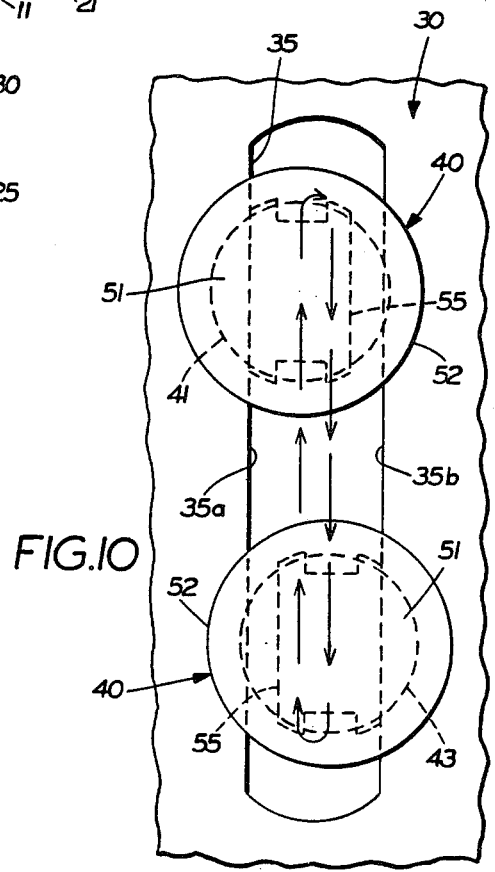

COMPACT DISC CLEANER

TECHNICAL FIELD

The present invention relates to a compact disc cleaner. More specifically, the present invention relates to the cleaning of a compact disc in a substantially radial direction in a relatively scratch-free manner.

BACKGROUND ART

In the past several years compact discs have been replacing phonograph records and magnetic tapes as a means of capturing sound recordings for playback due to the clarity of the sound reproduction and the resistance of the disc to external scratching and marring during handling thereof. Even though these compact discs are more resistive to scratching than phonograph records and/or magnetic tapes, it is desirable to occasionally clean the same to maintain the excellent sound reproduction characteristics.

It is well known in the cleaning of such compact discs that the cleaning motion should be in a radial direction across the circumferencially extending grooves, which are arranged similar to the grooves of a phonograph record, to prevent damaging the microscropic grooves formed therein. Several devices have been produced for achieving such cleaning action by rotating the disc or moving a cleaning pad across the compact disc or a combination of both by a crank and lever arm mechanism. Although these prior devices may provide a satisfactory cleaning solution, they are relatively expensive, bulky and cumbersome to operate and to store.

Therefore the need has existed for an improved cleaning device for compact discs which provides the desired radial cleaning motion of the pad across the circumferential grooves in a simple and inexpensive device, which device preferably is of the same size and shape as a usual compact disc storage container enabling the device to be stored with the compact discs in a usual storage device.

SUMMARY OF THE INVENTION

It is therefore an aspect of the present invention to provide a compact disc cleaning device.

It is a further aspect of the present invention to provide a compact disc cleaning device, as above, wherein said disc is cleaned in a substantially radial direction.

It is a still further aspect of the present invention to provide a compact disc cleaning device, as above, wherein the disc cleaning device contains cleaning pads and a cover, wherein the cover has an elongated slot for slidably receiving a post assembly, and wherein the post assembly is capable of engaging a compact disc so that movement of the post assembly in a linear direction in the elongated slot moves the disc in a substantially radial manner across the cleaning pads.

It is a yet further aspect of the present invention to provide a compact disc cleaner, as above, wherein the post assembly is capable of transverse movement in the elongated slot and wherein the compact disc is capable of pivoting upon a side region of the device to provide a partial rotational movement to the disc as it moves generally radially across the cleaning pads.

These and other aspects of the present invention will be better understood by reference to the following specification.

In general, a device for cleaning a compact disc comprises:

the device, said device having a bottom wall region and an optional pair of spaced apart end walls, at least one cleaning pad, said cleaning pad residing on said bottom region, a cover, said cover having an elongated slot therein, a post means for engaging said cover slot, said post means having a first post end insertable into the central opening of a compact disc and a second end, said second end engaging said elongated slot.

BRIEF DESCRIPTION OF THE DRAWINGS

FIG. 1 is an expanded perspective view of a compact cleaning device according to the present invention.

FIG. 2 is an expanded perspective view of a post assembly.

FIG. 3 is a perspective view of one portion of the post assembly.

FIG. 4 is a top plan view of another portion of the post assembly.

FIG. 5 is a top plan view of the assembled compact disc cleaning device with portions broken away.

FIG. 6 is an end elevational view of the device of FIG. 5.

FIG. 7 is an enlarged cross-sectional view showing the post assembly, taken on line 7—7 of FIG. 5.

FIG. 8 is a perspective view of a compact disc.

FIG. 9 is a diagrammatic top plan view showing the post assembly and the compact disc in two different locations.

FIG. 10 is a partial top plan view showing the post assembly in two different positions similar to that of FIG. 9.

Similar numerals refer to similar parts throughout the drawings.

BEST MODE FOR CARRYING OUT THE INVENTION

The compact disc cleaning device of the present invention is generally indicated by the numeral 10. Cleaning device 10 has a housing 11 which is made of any suitable material such as metal and preferably plastic. The cleaning device has a bottom region or wall which generally contains cleaning pads thereon. The bottom region can be a tray 20, discussed herein below, or bottom wall portion 12 of the housing. In either event, the housing or tray can generally be of any shape such that a disc is supported thereon. A desired shape is rectangular and preferably is the same size as a usual storage container for compact discs.

The housing optionally contains end walls 13 thereon. That is, although not necessarily required, end walls 13 desirably exist. The end walls preferably have an elongated opening 14 therein to permit the compact disc to move partially in and out of the housing, thereby reducing the size of the housing to that of a usual compact storage container. As shown in FIG. 1, opening 14 generally extends into the central portion of the end wall. Side portions of the end wall exist to retain a tray, if utilized, within the housing. The opening partially extends down toward bottom wall 12 such that an end wall lip 13a exists.

Device 10 also contains sidewall regions which can be either located on the housing, the optional tray, or both. Sidewalls 15 are usually integrally connected to end walls 13. When a tray is utilized, housing 11 contains a stop 17 mounted on housing bottom wall 12. The location of the stop is such that lateral movement of the tray, that is side to side movement, is prevented.

Desirably, the cleaning device contains tray 20 therein. Tray 20 can also be made of metal but desirably is plastic. Although a generally rectangular tray 20 is shown, the tray can generally be of any size or shape so long as it can receive or support a compact disc thereon. When a tray is utilized, the bottom region of the device encompasses tray bottom 21 (FIG. 1). Similarly, the sidewall region of the device encompasses tray sidewalls 22.

An important aspect of the present invention is the utilization of cleaning pads which are located in the bottom region of the device. The cleaning pads can be made of any suitable non-abrasive cleaning material capable of cleaning a compact disc. Generally, the cleaning pads are of a non woven, lint free fibrous material such as felt, polyester, or the like, and have a sponge backing. As shown in FIG. 1, cleaning pads 25 are located adjacent to the end portions of the tray or device. The cleaning pads can be of any shape and size so long as they generally contact all surfaces of the compact disc during cleaning thereof. Preferably as shown in FIG. 1, cleaning pads 25 are arcuate and more specifically, a segment of an annulus having an arcuate length of between 60° and 70°. The cleaning pads 25 can also exist on the bottom region of the housing (not shown), that is mounted on bottom housing wall 12 as when a tray is not utilized. Tray 20 is desirable in that it is replacable. Thus, upon wear of cleaning pads, a new tray can be inserted into the device and utilized. Pads 25 preferably are mounted on the tray or bottom wall by a pressure sensitive adhesion or the like.

Another aspect of the present invention is that the sidewall regions of the device, that is, either the housing or the tray, can contain roll surface strips thereon. Such strips 27 which are located on the tray can be made of any soft yet frictional material such as rubber, sponge and the like.

Cleaning device 10 contains a cover 30 (FIG. 1). The cover can also be made of metal or preferably a plastic material. Cover 30 contains optional end walls 32. Desirably, end walls 32 exist and have an opening 33 formed in the central portion thereof. The opening partially extends into the end wall such that a lip 33a is formed. Cover 30 also contains an elongated slot 35 typically in the central portion thereof. Slot 35 is generally of an oblong configuration, contains a left edge 35A, a right edge 35B, and extends in a longitudinal direction toward the cover ends. More specifically, slot 35 is rectangular in shape except for the end portions thereof which are arcuate.

As shown in FIG. 1, tray 20 resides within housing 11. Cover 30 resides over the tray. The cover is hinged at one end thereof such that a lid is formed. A pair of holes 28 are formed in end walls 13 adjacent one sidewall 15 for pivotably mounting lid 30 thereon. Lid 30 is formed with a pair of bosses or nubs 39 on extensions of end walls 32 which extensions are located on the outside of end walls 13 with bosses 39 projecting into holes 28. A hinged cover 37 is formed with a pair of bosses or nubs 38 on outwardly extending flanges 29 which flanges are located inside of end walls 13 of housing 11 with bosses 38 projecting into holes 28 abutting against bosses 39 of cover 30. This arrangement provides an easy snap-together construction whereby cover 30 is pivotably mounted on housing 11 by the simple engagement of nubs 38 and 39 in common holes 28, with the pivot being covered by coverplate 37.

The cleaning device of the present device of the present invention cleans a compact disc 60 as shown in FIG. 8. These discs contain very high quality sound recordings thereon and are often manufactured with the use of lasers and hence are commonly referred to as laser discs. The laser disc contains a circular aperture 62 in the center thereof.

A post assembly, generally indicated by the numeral 40, has a first post end 41 and a second post end 51. Considering the first post end portion, as best seen in FIG. 7, it contains a flange 43 as well as a tapered cylindrical projection surface 44. Surface 44 is of a diameter such that it is insertable into central opening or aperture 62 of the disc. That is, the diameter of first post end projection 44 is such that it engages disc aperture 62 and permits the disc to rotate. The first post end also contains a central aperture 45 which generally extends therethrough.

The second post end 51, as best seen in FIG. 3, has an enlarged knob head 52 and a knob projection 53. The knob projection has an outside diameter such that it matingly engages in first post end aperture 45. More specifically, knob projection 53 securely engages aperture 45 by a press fit, a solvent weld, or an ultrasonic weld. When assembled as shown in FIG. 7, second post end 51, through knob projection 53, engages central aperture 45 of the first post end 41, which, in turn through projection 44, engages a compact disc. Thus, through manual movement of knob head 52, the compact disc will also be moved. While knob 52 can be of different sizes and shape, it is important that it be larger than the width of the elongated slot 35. The second post end contains a pair of spaced parallel ridges 55 thereon as best shown in FIGS. 3 and 10. Ridges 55 selectively engage one of the sides of elongated slot 35 during movement of knob 52 therein to prevent the rotation of knob 52 as it is moved linearly along slot 35. The width between ridges 55 is less than the width of the elongated slot. Knob 52 can thus be moved transversely or sideways within elongated slot 35 as shown in FIGS. 9 and 10.

The operation of cleaning a disc is as follows. A tray 20 containing cleaning pads 25 thereon is inserted into housing 11 and positioned against stop 17. The compact disc is then placed on the tray and centered with regard to the cleaning pads. Cover 30 is closed and first post end projection 44 is inserted into disc central aperture 62. Once post assembly 40 has been inserted into the disc, it can be moved linearly along elongated slot 35. Desirably, post assembly 40 is moved in a clockwise fashion as shown by the arrows in FIGS. 1, 5, and 10. That is, one of the ridges 55 of the second post end portion is made to bear against left edge 35A of the slot and moved in an upward or longitudinal direction. Upon engaging the upper portion of slot 35, knob 52 is moved transversely or to the right such that ridge 55 then contacts right slot edge 35B. Knob 52 is then moved downwardly or longitudinally until it reaches the bottom portion of slot 35 at which time it is moved transversely or to the left.

The linear movement of post assembly 40 in slot 35 will move compact disc 60 in a substantially radial direction across cleaning pads 25. Inasmuch as roll surface strips 27 are contacted upon movement of the post assembly along the respective edges of slot 35, disc 60 alternatively contacts the side surface strips and is caused to roll thereabout. Thus, not only does the clockwise reciprocal motion cause the disc to move in a generally radial direction across the cleaning pads, but with each stroke the disc is slightly rotated, thereby exposing another portion of the disc to the cleaning action of the pads. In other words, the side regions of the device, such as tray sidewall 22 are so positioned so that upon contact of ridges 55 with slot edges 35A or 35B, the periphery of the disc engages pivot surface 27 and is caused to move thereabout by rolling thereon. As thus shown in FIG. 9, the disc will alternatively engage the left hand pivot surface (upper disc) and subsequently the right hand pivot surface (lower disc).

Any number of discs can be cleaned until the cleaning pads are generally worn. New pads can be inserted by merely inserting a new tray 20. Inasmuch as housing end portions 13 and cover end walls 32 have openings therein, the disc is free to move partially into and out of the device thereby reducing the size of the device. A usual cleaning solution can be added to the cleaning pads to increase the cleaning effectiveness thereof.

The improved compact disc cleaning has a number of advantages over prior art cleaning devices. The device preferably has a shape and size equal to that of a usual compact disc storage container which enables the cleaning device to be mounted in a rack or other holder in which the disc containers are mounted. The improved device preferably is molded of plastic which provides an inexpensive yet sturdy and durable device and which is manipulated easily by the manual movement of the post assembly in a generally linear motion along both edges of the lid slot. Although the cleaning motion is described as being radially, it will be in a somewhat curved radial direction due to the combination of rotational and linear movement of the disc as it moves within the housing across the cleaning pads. Furthermore, the cleaning pads may have other configurations than that shown in the drawings but preferably are of a relatively small size as shown therein. Since the greater the size of the pads, the greater will be the circumferential cleaning action on the disc, instead of the desired radial cleaning action thereon as the disc moves across the pads. The smaller the pad, the more true will be the radial cleaning motion. However, if the pads are too small, it requires an excessive amount of motion to clean the entire surface of the disc. Therefore, the size selected and shown in the drawings is preferred in that it provides a relatively large surface and radial cleaning action on the disc and enables the disc to be cleaned in a relatively few number of cleaning motions of the post assembly along the lid slot.

Accordingly, the improved compact disc cleaner is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved compact disc cleaner is constructed and used, the characteristics of the construction, and the advantageous, new and useful results obtained; the new and useful structures, devices, elements, arrangements, parts, and combinations, are set forth in the appended claims.

What is claimed is:

1. A device for cleaning a compact disc, comprising:
   a housing, said housing having a bottom wall, and an optional pair of spaced end walls,
   at least one cleaning pad, said cleaning pad located on said housing bottom wall,
   a cover, said cover having an elongated slot therein, and
   a post assembly, said post assembly transversely and longitudinally mounted in said cover slot, and said post assembly having a first post end insertable into the central opening of a compact disc.

2. A device for cleaning a compact disc according to claim 1, wherein said post assembly has a second end, said second end being transverely and longitudinally mounted in said cover slot, and whereby movement of said post assembly in said longitudinal direction is capable of imparting a substantially radial cleaning motion to a compact disc located within the housing.

3. A device for cleaning a compact disc according to claim 2, wherein said housing includes a pair of spaced sidewalls, and a pair of spaced end walls, said second end of said post assembly having a knob and the width of said knob being greater than the transverse width of said elongated cover slot.

4. A device for cleaning a compact disc according to claim 3, wherein said post assembly second end has a pair of ridges, said ridges residing in said elongated slot.

5. A device for cleaning a compact disc according to claim 4, wherein said end walls have openings therein, wherein said cleaning pad is located adjacent to one of said end walls, and wherein said post assembly first end securely engages said post assembly second end.

6. A device for cleaning a compact disc according to claim 1, including a tray, wherein said tray resides in said housing, and wherein a pair of said cleaning pads are located on said tray.

7. A device for cleaning a compact disc according to claim 6, wherein said post assembly has a second end, said second end being transversely and longitudinally slidably mounted in said cover slot, and whereby movement of said post assembly in said longitudinal direction is capable of imparting a substantially radial cleaning motion to a compact disc across the cleaning pads.

8. A device for cleaning a compact disc according to claim 7, wherein said tray has at least one sidewall containing a roll surface thereon; and in which a compact disc rolls along said roll surface as the post assembly is moved longitudinally along the cover slot.

9. A device for cleaning a compact disc according to claim 8, wherein said second end of said post assembly has a knob and the width of said knob being greater than the transverse width of said elongated cover slot, and wherein said post assembly second end has a pair of ridges, said ridges residing in said elongated slot.

10. A device for cleaning a compact disc, comprising:
    the device, said device having a bottom wall region, and an optional pair of spaced apart end walls,
    at least one cleaning pad, said cleaning pad residing on said bottom region, a cover, said cover having an elongated slot therein, and a post means for engaging said cover slot, said post means having a first post end insertable into the central opening of a compact disc and a second end, said second end engaging said elongated slot.

11. A device for cleaning a compact disc according to claim 10, wherein said post means transversely and longitudinally engages said elongated slot.

12. A device for cleaning a compact disc according to claim 11, wherein said second post end has a pair of spaced apart ridges, wherein said ridges alternately slidably engage opposite edges of said elongated slot to move the compact disc in a generally radial direction across the cleaning pad as the post means transversely and longitudinally engages said elongated slot edges.

13. A device for cleaning a compact disc according to claim 12, including said pair of spaced apart end walls, including a sidewall region, wherein said sidewall region contains at least one pivot surface whereby movement of said post means is capable of causing a disc to engage said pivot surface and to pivot thereon.

14. A device for cleaning a compact disc according to claim 13, wherein longitudinal movement of said post means is capable of causing substantially radial cleaning of a disc.

15. A device for cleaning a compact disc according to claim 14, including a tray, said tray located in said bottom wall region, said tray having at least one sidewall, said tray sidewall located in said sidewall region.

16. A device for cleaning a compact disc according to claim 15, wherein said second post end has a projection, wherein said first post end has an aperture, and wherein said second post end projection is securely engaged within said first post end aperture.

17. A device for cleaning a compact disc according to claim 10, wherein a pair of cleaning pads reside in said bottom region spaced longitudinally apart at opposite ends of the cover slot.

18. A device for cleaning a compact disc according to claim 17, wherein said cleaning pads have an arcuate shape.

* * * * *